United States Patent [19]

Wedel

[11] 4,101,479

[45] Jul. 18, 1978

[54] POLYOLEFIN PHOTOSTABILIZER COMPOSITION

[75] Inventor: Carroll J. Wedel, Walnut Creek, Calif.

[73] Assignee: Chevron Research Company, San Francisco, Calif.

[21] Appl. No.: 777,201

[22] Filed: Mar. 14, 1977

Related U.S. Application Data

[63] Continuation of Ser. No. 614,388, Sep. 18, 1975, abandoned.

[51] Int. Cl.² ........................... C08K 5/36; C08K 5/09
[52] U.S. Cl. ..................... 260/23 H; 260/45.75 N; 260/45.85 S; 428/920
[58] Field of Search ................ 260/45.75 N, 45.85 S, 260/23 H; 428/920

[56] References Cited

U.S. PATENT DOCUMENTS

| 3,163,492 | 9/1964 | Thomas | 260/23 |
| 3,322,705 | 5/1967 | Kauder et al. | 260/23 |

OTHER PUBLICATIONS

Polymer Engineering and Science–Jul. 1966, pp. 231 to 239.

*Primary Examiner*—V. P. Hoke
*Attorney, Agent, or Firm*—D. A. Newell; T. G. DeJonghe; Lawrence S. Squires

[57] ABSTRACT

Polyolefins are stabilized against photodegradation by the inclusion of 0.1–5 weight percent of a synergistic photostabilizer composition consisting of a thiodiester and the nickel salt of a monocarboxylic acid.

11 Claims, No Drawings

POLYOLEFIN PHOTOSTABILIZER COMPOSITION

BACKGROUND OF THE INVENTION

This is a continuation of application Ser. No. 614,388, filed Sep. 18, 1975, and now abandoned.

FIELD OF THE INVENTION

This invention relates to a photostabilizer composition for polyolefins.

Substantially crystalline poly-1-olefins, such as polypropylene, are in great demand for the making of films, molded articles, fibers and yarns. The yarns, for example, find use in the manufacture of indoor-outdoor carpet pile which undergoes exposure to sunlight in normal use. Polyolefins have a tendency to degrade when exposed to sunlight. Photodegradation is evidenced by a deterioration in physical properties, as by embrittlement and flexural failure of the polyolefin material. In the case of a polyolefin carpet pile, the outdoor carpet or grass-like playing field surface will have poor wearing qualities and a short life unless the polyolefin is stabilized by the inclusion of materials which provide it with resistance to photodegradation.

Stabilizers vary in compatibility and effectiveness with polymers of different chemical constitution, i.e., polyvinyl chloride, polystyrene, polyester, polyolefin, etc., may require different stabilizers. Stabilizers also vary in their ability to absorb ultraviolet light, in their ability to quench radiation-induced excitation in the polymers, in resistance to removal by volatilization or extraction and in their resistance to the prolonged effects of oxygen, light and water. Although prior art compounds and combinations confer an appreciable degree of stability to polyolefins, there is a need for stabilizers which effectively inhibit photodegradation over long periods of time.

SUMMARY OF THE INVENTION

A composition capable of providing superior ultraviolet stability to polyolefins consists of the synergistic combination of a thiodiester and the nickel salt of a monocarboxylic acid in mol ratio of about 0.25–2:1. Polyolefin compositions are stabilized by the inclusion of 0.1–5 weight percent of this combination, as are pile fabrics or shaped articles made from such stabilized polyolefin compositions.

DETAILED DESCRIPTION OF PREFERRED EMBODIMENTS

The normally solid, substantial crystalline poly-1-olefins produced from $C_2$–$C_6$ monomers are well-known commercial commodities. Such polymers include Ziegler polyethylene, high-density polyethylene, stereoregular poly(butene-1), poly(4-methylpentene-1), etc. Stereoregular, normally solid, substantially crystalline polypropylene is the preferred polyolefin of the present invention. Polypropylene is effectively stabilized by the synergistic combination of the nickel salt of a monocarboxylic acid and a thiodiester of the present invention. Such polypropylene is normally at least about 50 percent crystalline in character and is essentially insoluble in refluxing heptanes.

The nickel salts of monocarboxylic acids of this invention are $C_3$–$C_{30}$ nickel salts of nonaromatic monocarboxylic acids. They are nickel salts of cyclic or acyclic monocarboxylic acids such as the naphthenic acids and alkanoic acids and substituted monocarboxylic acids such as hydroxy and amino acids. The nickel monocarboxylates which find use within the scope of the present invention are preferably the nickel salts of fatty acids of from about 9 to about 30 carbon atoms, and most preferably the saturated fatty acids such as n-undecanoic, lauric, myristic, palmitic, stearic and other naturally occurring and synthetic acids of the general formula $C_nH_{2n+1}COOH$. Branched-chain fatty acids, such as isostearic acid, are also included, as well as substituted acids such as hydroxy stearic acid. The nickel stearates are particularly preferred for their effectiveness. The nickel salts of monocarboxylic acids are produced by methods known in the art.

The thiodiester which finds use within the scope of the present invention is a diester of the formula

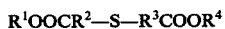

$$R^1OOCR^2—S—R^3COOR^4$$

wherein $R^1$ and $R^4$, like $R^2$ and $R^3$, are hydrocarbyl groups which may be the same or different and each contains from 1 to about 20 carbon atoms. $R^1$ and $R^4$ encompass monovalent radicals such as alkyl, alkenyl, cycloalkyl, aralkyl and alkaryl radicals. $R^1$ and $R^4$ are exemplified by methyl, ethyl, propyl, isopropyl, butyl, isobutyl, t-butyl, amyl, hexyl, octyl, isooctyl, 2-ethylhexyl, t-octyl, decyl, dodecyl, octadecyl, methyl cyclohexyl, ethyl cyclohexyl, and phenyl, tolyl, xylyl, ethyl phenyl, etc.

$R^2$ and $R^3$ encompass divalent radicals such as alkylene, arylene, cycloalkylene, and alkarylene radicals. $R^2$ and $R^3$ are exemplified by methylene, ethylene, methylmethylene ($CH_3CH$), propylene, isopropylene, butylene, isobutylene, t-butylene, phenylene, tolylene, ethyl phenylene, etc.

Thiodiesters finding use within the scope of the invention are exemplified but not limited to such esters as
diethylthiodiacetate,
dihexylthiodiacetate,
diisobutylthiodiacetate,
diarylthiodiacetate,
di-beta-phenylethylthiodiacetate,
di-n-amylthiodipropionate,
dibenzylthiodipropionate,
n-hexyl-(n-heptyl)thiodipentanoate,
diphenylthiodidodecanoate(dilaurate),
dicyclohexylthiodioctadecanoate,
diisoamylthiodibenzoate,
dibenzylthiodisalicylate, and
dimethylthiodiphenylacetate.

Examples of the thiodiesters which are particularly preferred in the present invention are the dialkylthiodialkanoates such as dicetyl-, dimyristyl-, dilauryl-, distearyl-, ditridecyl-, cetylmyristyl-, lauryl-stearyl-, and di-2-ethylhexylthiodialkanoate as well as dialkylthiodipropionate, -dibutyrate, -diglycolate, and -distearate. Thiodiesters are, for the most part, known compounds, but where they are not otherwise available, they may be produced by the esterification of the thiodiacid with the corresponding alcohol(s).

In a particular embodiment of the present invention, the stabilizer composition comprises nickel stearate/ditridecylthiodipropionate (i.e., nickel stearate/ditridecyl-TDP), but any other combination of the disclosed thioesters and nickel carboxylate is also within the scope of the invention described herein.

The mol ratio of nickel carboxylate to thiodiester for purposes of this invention is about 1:0.25–2 with a mol ratio of about 1:1 being preferred. In a preferred embodiment of the invention, the synergistic combination is incorporated into the polyolefin composition at a level of from about 0.1 to about 5% by weight, preferably from about 1 to about 4% by weight, based on the total weight of the polyolefin composition.

The ultraviolet-light stabilized poly-1-olefin composition of this invention finds embodiment in various films, fibers, fabrics, molded articles, yarns, etc., and has a preferred embodiment in the form of pile fabric such as that normally found in indoor/outdoor carpets which has exposure to sunlight. These pile fabrics need to be resilient in order to have the desired softness, so any tendency of the pile fabric to embrittle and lose its flexural quality will result in undesirable wear and should be minimized. There are various suitable pile yarns, including both extruded fiber and fibrillated film, with the latter being preferred for the present purposes due to its usefulness in the production of long-life outdoor carpet and playing-field surfaces. Examples of fibrillated film materials and their process of manufacture in the form of "fibrous web" are described in considerable detail in U.S. Pat. Nos. 3,496,259 and 3,496,260.

The polymeric compositions of the present invention may also contain certain additives which are conveniently and conventionally used to impart desirable properties such as additional photostabilizers, e.g., nickel thiobis(t-octyl-phenol) or 2-hydroxybenzophenone, antioxidants, heat stabilizers, dye acceptors, pigments, dyes, fillers and the like.

The polyolefin composition is stabilized by the synergistic stabilizer combination of this invention by blending the two components into the polyolefin powder or granulate in any order. Other methods of combination may be used. In a preferred embodiment, the components of the stabilizer are mixed together, as in a polymer concentrate, before being added to the bulk of the polyolefin. Other additives such as dies, plasticizers and antioxidants may be blended at the same time. The composition may then be molded, extruded, or spun as required to produce the desired article, film, filament, etc., having this composition.

In preferred embodiments of the polyolefin composition of this invention, and in molded articles, yarns, fabrics, etc., made therefrom, there is present, in addition to the 0.1–5 weight percent of the synergistic stabilizer composition, 0.1–3 weight percent, preferably 0.5–1 weight percent, based on the weight of the total polyolefin composition, of a 2-hydroxybenzophenone stabilizer such as 2,4-dihydroxybenzophenone, 2-hydroxy-4-methyloxybenzophenone, 2-hydroxy-4-n-octyloxybenzophenone, 2-hydroxy-4-methyloxy-5-sulfobenzophenone, 4-dodecyloxy-2-hydroxybenzophenone and 2,2′,4,4′, -tetrahydroxybenzophenone.

EVALUATION

Table I shows the unexpected effectiveness of a typical synergistic combination of nickel carboxylate and a thiodiester in stabilizing a polyolefin by means of an ultraviolet stability test. Typical synergistic combinations are compared to individual components and a known ultraviolet stabilizer, 2-hydroxy-4-n-octyloxybenzophenone. In these examples, commercial polypropylene powder was blended with stabilizer components in a mixer until homogeneous. The composition was hot-pressed into a film of 1.5-mil thickness. Film samples were continuously exposed to ultraviolet radiation from a mercury lamp. Test results are given as the relative time to failure, which is the time of exposure until failure of the test film divided by the time of exposure until failure of an unstabilized polypropylene film sample. Consequently, the results are expressed as relative stability. Film failure is indicated by embrittlement or rupture on flexing.

TABLE I

Effect of Nickel Carboxylate/thiodiester on Polyolefin Stabilization[1]

| | Ex. 1 | Ex. 2 | Ex. 3 | Ex. 4 | Ex. 5 | Ex. 6 |
|---|---|---|---|---|---|---|
| Nickel Stearate | 0 | 0 | 0 | 1.8 | 1.8 | 1.8 |
| Thiodiester[2] | 0 | 0 | 1.45 | 0 | 1.45 | 0 |
| Thiodiester[3] | 0 | 0 | 0 | 0 | 0 | 1.65 |
| UV 531[4] | 0 | 1.5 | 0.6 | 0.6 | 0.6 | 0.6 |
| Relative Time to Failure | 1.0 | 1.75 | 1.5 | 1.75 | 5.0 | 3.7 |

[1]1.5 mil green-pigmented polypropylene film. Additives given as weight percent.
[2]Di(tridecyl)thio dipropionate
[3]Distearyl thiodiacetate
[4]2-hydroxy-4-n-octyloxy benzophenone

TABLE II

Effect of Mol Ratio of Nickel Carboxylate/thiodiester on Polyolefin Stabilization[1]

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Nickel Stearate | 0 | 1.15 | 1.8 | 1.8 | 1.8 | 0 | 0 | 1.8 |
| Nickel Isostearate | 0 | 0 | 0 | 0 | 0 | 1.95 | 1.95 | 0 |
| Thiodiester[2] | 0 | 1.9 | 1.55 | 3.0 | 4.5 | 4.5 | 3.0 | 3.0 |
| UV 531[3] | 0 | 0.6 | 0.6 | 0.6 | 0.6 | 0.6 | 0.6 | 0 |
| Mol Ratio | — | 1/2 | 1/1 | 1/2 | 1/3 | 1/3 | 1/2 | 1/2 |
| Relative Time to Failure | 1.0 | 4.5 | 4.5 | 4.3 | 5.0 | 5.2 | 5.2 | 4.3 |

[1]1.5 mil green-pigmented polypropylene film. Additives in weight percent.
[2]Di(tridecyl)thio dipropionate
[3]2-hydroxy-4-n-octyloxy benzophenone Table I clearly shows the synergistic effect of nickel carboxylate and the thiodiester in combination. Either material alone shows a minor stabilizing effect over the pigmented film without stabilizer. When combined, however, their synergistic stabilizing effect is evident. Table II shows that the stabilizing effect of the synergistic combination is not strongly dependent on the mol ratio of nickel carboxylate to the thiodiester.

What is claimed is:

1. A composition providing resistance to the photodegradation of a polyolefin produced from $C_2$–$C_6$ monomers comprising a nickel salt of a $C_3$–$C_{30}$ nonaromatic monocarboxylic acid and a thiodiester of the formula $R^1OOCR^2$—S—$R^3COOR^4$ in mol ratio of about 1:0.25–2, wherein $R^1$ and $R^4$, and $R^2$ and $R^3$, are hydrocarbyl groups which may be the same or different and each contains from 1 to about 20 carbon atoms.

2. A composition according to claim 1 wherein said hydrocarbyl groups $R^1$ and $R^4$ are $C_2$–$C_{20}$ alkyl groups which may be the same or different.

3. A composition according to claim 1 wherein said monocarboxylic acid is a $C_9$–$C_{30}$ fatty acid.

4. A composition according to claim 3 wherein said fatty acid is stearic acid.

5. A polyolefin composition of improved resistance to photodegradation comprising a major amount of a polyolefin produced from $C_2$–$C_6$ monomers, and an effective amount within the range of from 0.1 to about 5 weight percent, based on polyolefin composition, of the composition of claim 1.

6. A composition according to claim 5 wherein said polyolefin is polypropylene.

7. A pile fabric suitable for use outdoors comprising a backing material and pile yarn secured in said backing material, the pile yarn being composed primarily of the polyolefin composition of claim 5.

8. A shaped article primarily composed of the polyolefin composition of claim 5.

9. A composition according to claim 1 wherein said thiodiester is a dihydrocarbylthio dipropionate and said monocarboxylic acid is a $C_9$–$C_{30}$ fatty acid.

10. A composition according to claim 9 wherein said dihydrocarbylthio dipropionate is di(tridecyl)thio dipropionate and said fatty acid is stearic acid.

11. A composition according to claim 1 wherein $R^2$ and $R^3$ are each -$CH_2CH_2$- and said monocarboxylic acid is a $C_9$–$C_{30}$ fatty acid.

* * * * *